United States Patent [19]

Sim et al.

[11] 4,251,600

[45] Feb. 17, 1981

[54] METHOD OF PREPARING A SINTERED LITHIUM ALUMINATE STRUCTURE FOR CONTAINING ELECTROLYTE

[75] Inventors: James W. Sim, Evergreen Park, Ill.; Kimio Kinoshita, Cupertino, Calif.

[73] Assignee: The United States of America as represented by the Department of Energy, Washington, D.C.

[21] Appl. No.: 107,760

[22] Filed: Dec. 27, 1979

[51] Int. Cl.³ .................... H01M 8/14; B28B 1/26
[52] U.S. Cl. ...................... 429/12; 264/86; 264/125
[58] Field of Search .............. 264/86, 125; 429/38, 429/46, 247, 193

[56] References Cited

U.S. PATENT DOCUMENTS

| | | | |
|---|---|---|---|
| 3,845,185 | 10/1974 | Kamigaito et al. | 264/86 |
| 4,115,632 | 10/1978 | Kinoshita et al. | 429/46 |

*Primary Examiner*—Donald L. Walton
*Attorney, Agent, or Firm*—Richard G. Besha; Frank H. Jackson; Hugh W. Glenn

[57] ABSTRACT

A porous sintered tile is formed of lithium aluminate for retaining molten electrolyte within a fuel cell. The tile is prepared by reacting lithium hydroxide in aqueous solution with alumina particles to form beta lithium aluminate particles. The slurry is evaporated to dryness and the solids dehydrated to form a beta lithium aluminate powder. The powder is compacted into the desired shape and sintered at a temperature in excess of 1200 K. but less than 1900 K. to form a porous integral structure that is subsequently filled with molten electrolyte. A tile of this type is intended for use in containing molten alkali metal carbonates as electolyte for use in a fuel cell having porous metal or metal oxide electrodes for burning a fuel gas such as hydrogen and/or carbon monoxide with an oxidant gas containing oxygen.

9 Claims, No Drawings

METHOD OF PREPARING A SINTERED LITHIUM ALUMINATE STRUCTURE FOR CONTAINING ELECTROLYTE

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to methods of preparing porous structures for retaining electrolyte in fuel cells or in secondary electrochemical cells. The structures are of electrically insulating ceramics with sufficient porosity and pore size to retain molten electrolyte between the electrodes of the cell.

A molten carbonate fuel cell typically operates at high temperatures of about 900–1000 K to convert chemical energy to d.c. electricity. Fuels such as $H_2$ and CO or methanol and oxidant gases such as $O_2$ and $CO_2$ react together during this conversion. Typical reactions are as follows.
At the anode:

$$H_2 + CO_3^= \rightarrow CO_2 + H_2O + 2e^-$$
$$CO + CO_3^= \rightarrow 2CO_2 + 2e^-$$

At the cathode:

$$2e^- + CO_2 + \tfrac{1}{2}O_2 \rightarrow CO_3^=$$

Such molten carbonate fuel cells have been suggested as stacks of repeating elements. Each element contains an anode, a cathode and an electrolyte structure separating the two. Anode structures can include porous sintered nickel, possibly alloyed with chromium or cobalt for strength. Cathodes of similar structure contain nickel oxide formed by reaction with the cell oxidants. Suitable means of current collection and an electrically conductive separator plate between the anode of one cell and the cathode of the next cell in the stack are incorporated. Fuel cells of this type are more fully described in the assignee's copending application Ser. No. 107,741, filed Dec. 27, 1979 by Singh and Dusek entitled "Porous Electrolyte Retainer for Molten Carbonate Fuel Cell".

The electrolyte structure disposed between the electrodes can include an electrolyte of a mixture of alkali metal carbonates such as $Li_2CO_3$, $Na_2CO_3$ and $K_2CO_3$. Various mixtures and eutectic compositions of these materials well-known in the art can be employed to reduce melting points. For example, a mixture of 62 mole % $LiCO_3$ and 38 mole % $K_2CO_3$ has a melting point of about 750 K. Various other suggested electrolyte mixtures are given in U.S. Pat. No. 4,115,632, cited below in the Prior Art Statement.

Lithium aluminate structures and materials have been of particular interest in forming a porous substrate or matrix for molten alkali metal carbonates used as electrolytes in fuel cells. One method used in preparing lithium aluminate reacts alkali metal carbonates with alumina at temperatures of about 900 K. Since alumina and lithium carbonate are of substantially different densities, a homogeneous powdered mixture of these reactants is difficult to achieve. Methods of this type also are sensitive to the presence of aluminum hydroxide or water of hydration in the starting material. The presence of water may cause agglomeration, poor mixing of the powders and incomplete reaction to lithium aluminate. Aluminum hydroxide reacts too slowly with the carbonate at 900 K, but at higher temperatures undesirable particle growth occurs. Other methods have included various alkali metal compounds other than lithium hydroxide or lithium carbonate in the reaction mixture. Unfortunately materials such as potassium hydroxide have been found to encourage particle growth and decrease surface area of the lithium aluminate structure.

PRIOR ART STATEMENT

The following publications are related to but do not disclose applicants' invention as presently claimed.

U.S. Pat. No. 4,079,171 to Marianowski et al., entitled "Molten Carbonate Fuel Cell Electrolyte", Mar. 14, 1978, discloses a fuel cell with a paste electrolyte of molten alkali metal carbonate in solid lithium aluminate. The disclosure makes no reference to sintering lithium aluminate to provide an integral bonded structure.

U.S. Pat. No. 4,115,632 to Kinoshita et al., "Method of Preparing Electrolyte for Use in Fuel Cells." This patent discloses a method of preparing beta lithium aluminate particles of a preferred shape as ceramic support material within a fuel cell electrolyte. Although this reference at column 5, lines 5–38, refers to sintering regarding a mixture of alkali metal compounds that could include lithium aluminate, it in no manner teaches or puts the artisan in possession of the method of preparing the porous electrolyte structure of the present invention.

U.S. Pat. No. 2,908,749 to Broers, "Fuel Cell and Method of Producing Electrodes for Such a Cell", teaches the use of a sintered magnesium oxide layer for use as a porous carrier of electrolyte in a fuel cell.

SUMMARY OF THE INVENTION

In view of the above, it is an object of the present invention to provide a method of preparing a sintered structure of lithium aluminate for retaining molten alkali metal carbonates as electrolyte within a fuel cell.

It is a further object to provide a method of preparing a sintered lithium aluminate structure in which reaction mixtures containing powders of different density are avoided.

It is also an object to provide a method of preparing a porous electrolyte structure of gamma lithium aluminate without employing powdered lithium aluminate in gamma form.

In accordance with the present invention a method of preparing a porous structure for retaining molten electrolyte within a fuel cell is prepared by forming a slurry of alumina or aluminum hydroxide in an aqueous solution of lithium hydroxide. The slurry is dewatered and dried at an elevated temperature, causing at least a portion of the mixture to react and form hydrated lithium aluminate. The dried slurry can be comminuted to a smaller particle size if desired and heated to a calcining temperature in excess of 700 K to ensure complete reaction and to provide a dehydrated lithium aluminate in beta form. The beta lithium aluminate is compacted and sintered at a sufficient temperature in excess of 1200 K to simultaneously convert the beta lithium aluminate to gamma lithium aluminate and to form a porous integral structure.

In more specific aspects of the invention, the reactant slurry is substantially free of alkali metal hydroxides other than lithium hydroxide and the resulting dehydrated powder consists essentially of lithium aluminate in beta form. The compact of beta lithium aluminate is sintered at a preferred temperature of about 1200–1400 K.

DETAILED DESCRIPTION OF THE PREFERRED EMBODIMENT

In one manner of carrying out the method of the present invention, a slurry of alumina or aluminum hydroxide particles in water is prepared and lithium hydroxide solution added. Alumina or aluminum hydroxide is preferably of fine particle size, e.g. less than 1 micron mean particle size. The lithium hydroxide should be in sufficient stoichiometric amount to react with the alumina in accordance with the following reaction:

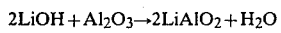

$$2LiOH + Al_2O_3 \rightarrow 2LiAlO_2 + H_2O$$

By adding the lithium hydroxide solution into an agitated slurry of alumina good contact is obtained between the solid particles and the lithium hydroxide to promote complete reaction. The reaction mixture as thus formed has been found to be less viscous than that provided by adding alumina powder into a solution of LiOH. The reaction mixture is heated to an elevated temperature at which it boils and evaporates to dryness. Temperatures of about 400–500 K are used in completing the drying and the reaction to form hydrated lithium aluminate.

In performing the drying step, the reaction slurry may be held at a suitable pressure and temperature to permit evaporation of the aqueous solution as the reaction occurs. Drying temperatures of 400–500 K are used to ensure complete reaction. Alternatively the slurry may be held at the reaction temperature and at pressure for a reaction period and subsequently evaporated and dried by such as spray-drying into a chamber of reduced pressure. As a further alternative the slurry can be slip casted in a porous mold or press to form a cake of the reaction materials. The cake can be heated to the reaction temperature to complete evaporation as the reaction proceeds.

The resulting beta lithium aluminate can be comminuted to smaller particle sizes in order to increase the surface area of the powder and ultimately the porous structure for containing the cell electrolyte. Particles with surface areas of about 10 to 40 m$^2$/g are desired.

The dried beta lithium aluminate powder is calcined to remove any water of hydration at a temperature in excess of the drying and reaction temperature. It is preferred that temperatures less than 900 K be used to avoid any substantial conversion of the lithium aluminate to other allotropic forms, e.g. gamma.

The beta lithium aluminate is pressed at a suitably high pressure to form a porous green compact of discrete particles. Pressures of 5–30 MPa can be used to provide sufficient strength for handling the green compact. The compact is then suitably sintered at a temperature below the melting point of lithium aluminate but sufficiently high, e.g. in excess of 1200 K, to provide mutual diffusion of material between adjacent contacting particles to form an integral sintered structure. Sintered structures of this type can be subsequently filled under vacuum with molten alkali metal carbonates which serve as electrolyte within a fuel cell.

In carrying out the method of the present invention, it is preferred that alkali metal hydroxides other than lithium hydroxide be excluded, particularly from the aqueous reaction slurry. The inventors believe materials such as potassium hydroxide may provide larger particles and a lower surface area in the resulting beta lithium aluminate. This undesirable effect may come about as a result of regional molten phases or sintering imparted by the reduction in melting point of alkali metal hydroxide mixtures. Under such conditions, agglomerates or recrystallization of larger particles can occur within the various steps of the process.

It is of a further advantage to exclude alkali metal carbonates from the various reaction and fabrication steps due to the reduction in melting and sintering temperatures that they may impart. Although small and insignificant amounts of carbonates may be formed by reaction of the desired constituents with $CO_2$ in air during the procedure, it is of importance that no alkali metal carbonates be added until the integral porous structure of gamma lithium aluminate has been formed with firm diffusion bonds between adjacent particles of lithium aluminate within the structure.

It is of further importance to the present invention that the lithium particles be maintained in beta form until they are converted in a simultaneous sintering and conversion procedure to gamma lithium aluminate. By delaying this conversion to gamma lithium aluminate until the final sintering step, sintered compacts of substantially increased porosity can be formed. Also particulate beta lithium aluminate can be provided with greater surface area than that of lithium aluminate in gamma form. On sintering, only small proportions of the surface area need be lost from the dried comminuted powder to the completed sintered compact.

The following examples are presented to illustrate the present invention.

EXAMPLE I

About 54 grams of Al(OH)$_3$ (Alcoa type C-33) is slurried into 0.25 liter of 2.7 M LiOH in aqueous solution. The suspension is heated at temperatures of about 425 K for 24 hours at atmospheric pressure. The major product is beta lithium aluminate with some hydrated LiOH detected. The product is ground and then calcined at 725 K to complete the reaction to form beta LiAlO$_2$ powder with a specific surface area of 41 m$^2$/g. The powder is compacted within a die at 27.6 MPa to form a flat disc compact of 2.9 cm diameter and 3.0 mm thick. The compact is then sintered at a temperature of 1265 K for 0.5 hour to provide an integral mass of about 62 percent porosity.

EXAMPLE II

About 102 grams of gamma Al$_2$O$_3$ (Degussa) is slurried into 0.675 liter of water and about 0.650 liter of 28 M LiOH in aqueous solution is added with stirring to the alumina suspension. The slurry is heated at temperatures of about 425 K for 22 hours at atmospheric pressure. The sample is ground and then calcined at 725 K for 2 hours and at 875 K for 2 hours. The powder is compacted within a press at 27.6 MPa to form a flat disc compact of 2.9 cm diameter and 3.3 mm thick. The compact is then sintered at 1265 K for 0.5 hour to produce an integral mass of 65 percent porosity.

EXAMPLE III

About 107 grams of Al(OH)$_3$ (Alcoa type H-705) is slurried into 0.53 liter of water and 0.53 liter of 2.6 M LiOH is aqueous solution is added with stirring to the suspension. The slurry is made less viscous by the addition of 0.20 liter of water. The suspension is dried at about 425 K for about 72 hours. The dried powder is ground and then calcined at 725 K for 4 hours. The beta lithium aluminate is compacted within a press at 27.6 MPa to form a flat disc compact of 2.9 cm diameter and 3.4 mm thick. The compact is then sintered at 1265 K for 0.5 hour to produce an integral mass of about 67 percent porosity.

EXAMPLE IV

About 74 grams of gamma $Al_2O_3$ (Degussa) is slurried into 0.53 liter of water and 0.53 liter of about 2.6 M LiOH in aqueous solution is added to the suspension with stirring. The slurry is heated at about 425 K for about 17.5 hours at atmospheric pressure. The dried powder is ground and then calcined at 725 K for 4 hours to produce beta lithium aluminate with a specific surface area of 32 $m^2/g$. The beta lithium aluminate is compacted at 15.8 MPa into a square plate with the approximate dimensions 10.6 cm×1.5 mm thick. The plate is sintered at 1265 K for 0.5 hour to produce an integral mass of about 66 percent porosity.

It is therefore seen that the present invention provides a method of preparing a porous lithium aluminate structure for containing molten alkali metal carbonates within a fuel cell. The method provides for reaction to form lithium aluminate in aqueous slurry and is therefore insensitive to allotropic or surface area changes that may result from moisture. In addition, less expensive materials such as alumina in hydrated form or aluminum hydroxide can be employed in contrast to the dehydrated alumina required in other methods. By delaying conversion to gamma lithium aluminate to the final sintering step, the porosity of the sintered structure is enhanced over those structures prepared from gamma lithium aluminate powders.

Although the present invention has been described for the preparation of separators for fuel cells, it will be clear that with appropriate modifications such separators may also be used with other electrochemical cells such as high-temperature, secondary cells. Cells such as those suggested in the assignee's copending application Ser. No. 25,629, filed Mar. 30, 1979 by Bandyopadhyay and Dusek, entitled "Method of Preparing Porous Rigid Ceramic Separators for an Electrochemical Cell" could be provided with separators prepared in the manner described herein. Various other modifications in the specific materials and process conditions described herein will be clear to one skilled in the art within the scope of the following claims.

The embodiments of the invention in which an exclusive property or privilege is claimed are defined as follows:

1. A method of preparing a porous structure for retaining molten electrolyte within an electrochemical cell comprising:
    preparing a reaction mixture containing oxidized aluminum as alumina or aluminum hydroxide slurry with a solution of lithium hydroxide to react with said oxidized aluminum and form lithium aluminate;
    reducing said mixture to dryness;
    calcining said dried mixture to form a dehydrated powder containing beta lithium aluminate;
    compacting said powder containing beta lithium aluminate to form a porous green compact; and
    sintering said compact at a temperature in excess of 1200 K but less than the melting point of lithium aluminate simultaneously to form a porous integral structure and to convert said beta lithium aluminate to gamma lithium aluminate.

2. The method of claim 1 wherein said mixture is prepared by adding a solution of lithium hydroxide to a slurry of oxidized aluminum.

3. The method of claim 1 wherein said reaction mixture is reduced to dryness at a temperature of 400–500 K and then calcined at 700–800 K.

4. The method of claim 1 wherein said dehydrated powder consists essentially of beta lithium aluminate.

5. The method of claim 1 wherein said green compact is sintered at a temperature of 1200–1400 K to form a porous structure with particles of gamma lithium aluminate mutually diffused into adjacent particles to form an integral structure for containing molten alkali metal carbonates for use as electrolyte within a fuel cell.

6. The method of claim 1 wherein said dehydrated powder containing beta lithium aluminate has a surface area of about 10 to 40 $m^2/g$ and said porous integral structure for containing molten electrolyte has a porosity in excess of 60%.

7. The method of claim 1 wherein said dehydrated powder is compacted at a pressure of 5 to 30 MPa to form a porous green compact.

8. The method of claim 1 wherein said solution of lithium hydroxide and slurry are substantially free of other alkali metal hydroxides.

9. A porous structure for retaining molten electrolyte within a fuel cell prepared by the method of claim 1.

* * * * *